United States Patent [19]

Mandel et al.

[11] Patent Number: 4,900,391

[45] Date of Patent: Feb. 13, 1990

[54] RECIRCULATING FOLDER FOR DIRECT MAIL APPLICATION

[75] Inventors: Barry P. Mandel; William R. Burger, both of Fairport, N.Y.

[73] Assignee: Xerox Corporation, Stamford, Conn.

[21] Appl. No.: 286,104

[22] Filed: Dec. 19, 1988

[51] Int. Cl.$^4$ ........................................ B32B 31/00

[52] U.S. Cl. .............................. 156/364; 156/443; 270/37; 270/45; 493/420

[58] Field of Search ............... 156/364, 350, 226, 227, 156/443; 493/420, 421; 270/45, 37, 51

[56] References Cited

U.S. PATENT DOCUMENTS

| | | | |
|---|---|---|---|
| 1,833,296 | 11/1931 | Mentges | 493/420 |
| 3,242,637 | 3/1966 | Wills | 53/266 |
| 3,265,382 | 8/1966 | Sherman | 270/45 |
| 3,416,785 | 12/1968 | Sherman | 270/45 |
| 4,031,818 | 6/1977 | Kehoe | 93/63 R |
| 4,202,621 | 5/1980 | Yoshimura | 493/420 X |
| 4,223,882 | 9/1980 | Stocker | 493/420 X |
| 4,406,649 | 9/1983 | Yamamura | 493/421 |
| 4,668,212 | 5/1987 | Kotani | 493/421 X |
| 4,717,134 | 1/1988 | Ilda et al. | 270/45 X |
| 4,816,108 | 3/1989 | Beck et al. | 493/421 X |

*Primary Examiner*—David Simmons
*Attorney, Agent, or Firm*—William A. Henry, II

[57] ABSTRACT

A sheet recirculating, folding and gluing system folds documents, holds them at a wait station and then inserts them into another sheet which is folded and glued "on-line" to form an envelope.

15 Claims, 2 Drawing Sheets

RECIRCULATING FOLDER FOR DIRECT MAIL APPLICATION

This invention is directed to apparatus for folding and inserting letters into envelopes for mailing, and particularly to apparatus of this type which is a completely "hands-off" operation.

The flexibility and speed of present electronic printers make them ideal for use in a variety of billing and advertising applications.

Some "off-line" devices have been made which take electronically printed sheets (with the address printed on one side and the bill printed on the other) and fold and seal them to form envelopes as shown in FIG. 1. This yields a single sheet ready to mail output. Folding systems also exist which can nest other items into the sheet being folded.

For example, U.S. Pat. Nos. 3,265,382 and 3,416,785 disclose paper nesting on envelope apparatuses. Both patents disclose means, provided for producing a first fold of a sheet and for nesting a second folded sheet within the folded portions of the first sheet. Means are further provided to affect a second folding of the first sheet whereby the second sheet is completely enveloped within the first sheet. U.S. Pat. No. 3,242,637 is directed to a sheet folding and inserting apparatus wherein sheets and envelopes are fed in timed relation so that the sheet can be folded and inserted into the envelope. An envelope feeding mechanism includes a reciprocating rack which is cam actuated to feed an envelope at a proper time. In U.S. Pat. No. 4,031,818 an apparatus for preparing sealed envelope units with messages is disclosed and in FIG. 3 shows a folding station 26 for folded envelope blanks 33. An adhesive application station is provided as shown in FIG. 1. All of the above-mentioned patents are incorporated herein by reference to the extent necessary to practice the present invention.

As can be seen, no "on-line" system currently exists that can take electronically printed sheets, bills or advertisements, fold them and then put them into other printed sheets that have been folded to form envelopes.

Accordingly, and "on-line" recirculating folder apparatus for a direct mail application is disclosed that includes means for feeding a printed sheet to a folding station where a first fold is formed in the sheet. Subsequently, a second fold is placed in the sheet and the sheet is circulated to a wait station where the movement of the sheet is arrested before the sheet is recirculated to the folding station. Glue is applied to the edges of an address carrying sheet is forwarded to the folding station where, before a first fold is placed in the address carrying sheet, a control means is actuated to release the printed sheet held thereby in synchronism with the folding of the address carrying sheet such that the printed sheet is placed inside the first fold of the glue carrying sheet and the glue carrying sheet is subsequently double folded to form an envelope and is then directed to an output device.

The above mentioned features and others of the invention, together with the manner of obtaining them will best be understood by making reference to the following specification in conjunction with the accompanying drawings, wherein.

Figure 1:
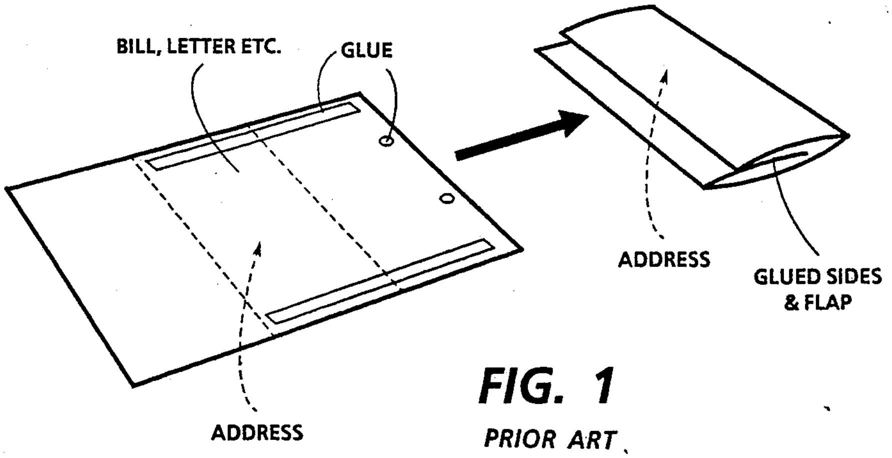
FIG. 1 PRIOR ART
FIG. 1 is a schematic representation of existing single sheet output technology now being done on "off-line" systems.

The present invention will hereinafter be described in connection with a preferred embodiment, however, it will be understood that it is not intended to limit the invention to that embodiment. On the contrary, it is intended to cover all alternatives, modifications and equivalents as may be included in the spirit and scope of the invention as defined by the appended claims.

For a general understanding of the features of the present invention, reference is had to the drawings. In the drawings, like reference numerals have been used throughout to designate identical elements.

It should be understood that when the above-mentioned patents were issued the recirculating folding system of a present invention would have been of little value. This is because electronic printers did not exist when the patents were issued and the entire folding and nesting process was done "off-line" with multiple feeders for the various documents. With electronic printers, it is now possible to feed one sheet with billing information, followed by another printed with advertisements, followed with another (large size sheet) printed with address and postage information. The recirculating folder system of the present invention when used with an electronic printing system facilitates a complete automation of the inserting and enveloping operations with less hardware than previous systems. In short, this system allows the delivery of ready to mail envelopes, filled with single or multiple insertions, directly from an electronic printer with no operator involvement or additional feeders required to achieve the nesting/inserting process.

Figure 2:
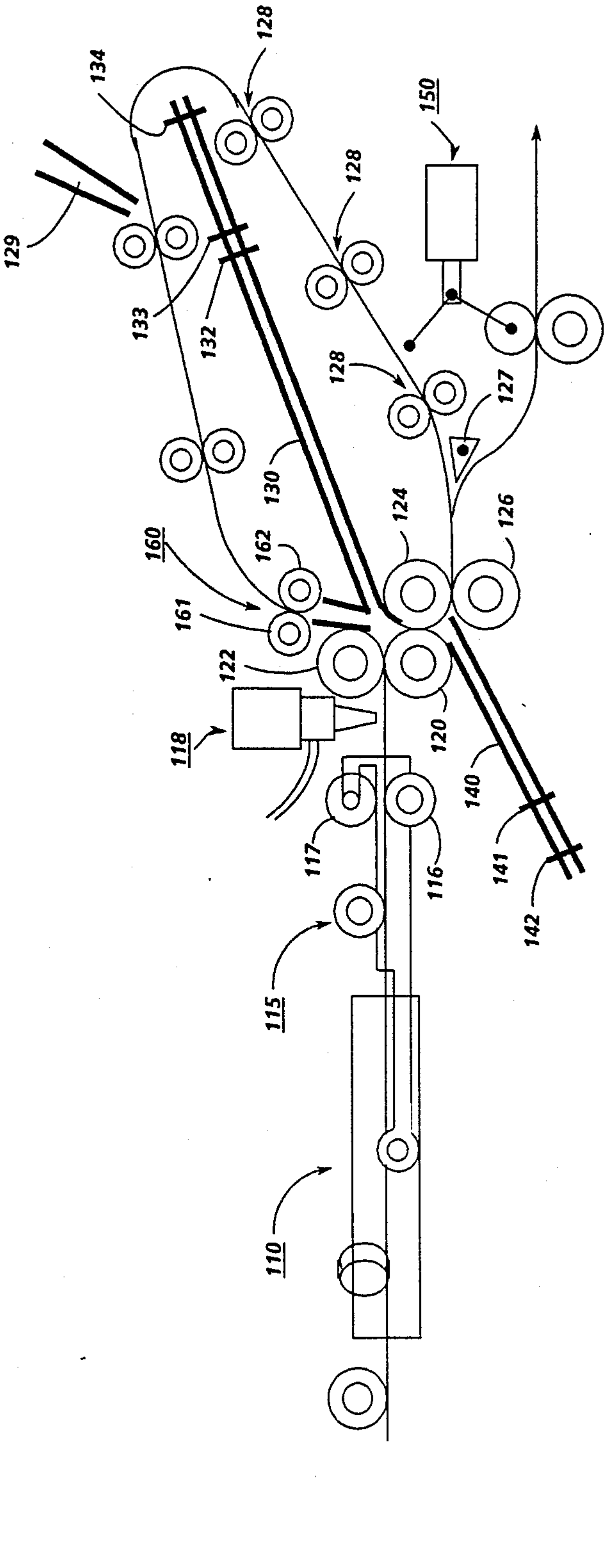
FIG. 2 is a side view schematic of a recirculating folder direct mail system in accordance with the present invention.

The "on-line" recirculating folder apparatus 100 of the present invention as shown in FIG. 2 comprises a conventional sheet turning station 110, such as in U.S. application Ser. No. 07/227,381 filed Aug. 2, 1988, entitled Sheet Turning and Registration System, assigned to the same assignee as the present application and is included herein by reference as well as the references cited therein. Turning station 110 accepts sheets from a conventional printer (not shown) with the long edge as the lead edge and turns each sheet so that its lead edge will be its short edge, i.e., for an $8\frac{1}{2}'' \times 11''$ sheet, the lead edge will exit the printer with the 11″ edge of the sheet as the lead edge and the sheet is turned in a conventional manner until the $8\frac{1}{2}''$ edge is the leading edge. Sheets entering the folding apparatus 100 are compiled in a conventional compiler 115 and fed individually therefrom by feed rolls 116 and 117 short edge first to drive roll 120 that cooperates with idler roll 122 to drive each sheet into first fold plate 130 and against first folding gate 132. Continued driving of the sheet by drive roll 120 causes the sheet to be forced into a nip formed between drive roll 120 and idler roll 124 creating a first fold in the sheet and into a second folding chamber 140. As drive roll 120 continues to rotate, the sheet is driven by drive roll 120 into a nip formed by drive roll 126 and idler roll 124 thereby placing a second fold in the sheet. The now twice folded sheet is then forwarded past deflector 127 that is in its down or home position which allows the sheet to be transported by transport nips 128 past an insertion station 129 to pre-nesting station 160 that includes conventionally clutched or servo driven rolls 161 and 162 to ensure precise timing of the nesting/insertion operation.

Meanwhile, an $8\frac{1}{2}'' \times 11''$ sheet printed with the address information is being fed into the folder apparatus. Before it enters the nip formed between rolls 120 and 122, an adhesive is applied by glue pens of a conventional gluing means 118 to the sides of the sheet in a manner similar to that used in single sheet applications. The now adhesive containing sheet is transported by drive roll 120 and a first fold is placed therein as described hereinbefore. During this operation, clutched rolls 161 and 162 are actuated and the pre-nesting, twice folded sheet is forwarded and nested into the first fold of the sheet containing the adhesive. Once the twice folded sheet has nested in the address carrying sheet, a second fold is placed in the sheet as described herein before and the now sealed envelope is forwarded by drive roll 126 passed deflector 127 which has been actuated into its raised position to allow the envelopes to be driven toward an output device or stacker (not shown). If desired, solenoid actuated perforators 150 could be used to perforate the edges of the envelope for easy opening. Depending on the required printing or copying rate, it may be necessary to print or copy and fold two $8'' \times 10''$ contents and then two $8\frac{1}{2}'' \times 11''$ envelopes, to give the contents time to recirculate.

If one desires to use only $8\frac{1}{2}'' \times 11''$ documents, this could be accomplished in either of two ways:

(1) an electronically actuated slitter could trim the $8\frac{1}{2}''$ wide sheets that were to be "contents" before they were nested into the $8\frac{1}{2}''$ "envelopes"; or (2) the sheets to become envelopes could be left unturned from the electronic printer and folded to form an $11''$ envelope.

If the system is to be used for direct mail applications, it is important that the inserted documents be smaller than the outside, or envelope, document. There are two main alternatives that could be considered to achieve this period. First, the outside or "envelope" sheet could be printed on a larger size sheet than the inserted sheets by utilizing the multiple input trays available on present electronic printers. Alternatively, slitters or trimmers could be added to the recirculating loop to trim the sides of sheets that were to be inserted into the full size "envelope" sheets. Of course, if the recirculating system was used just to perform multiple insertion operations and not as a direct mail type system the same size sheets could be used and the above alternatives would be unnecessary.

Figure 3:
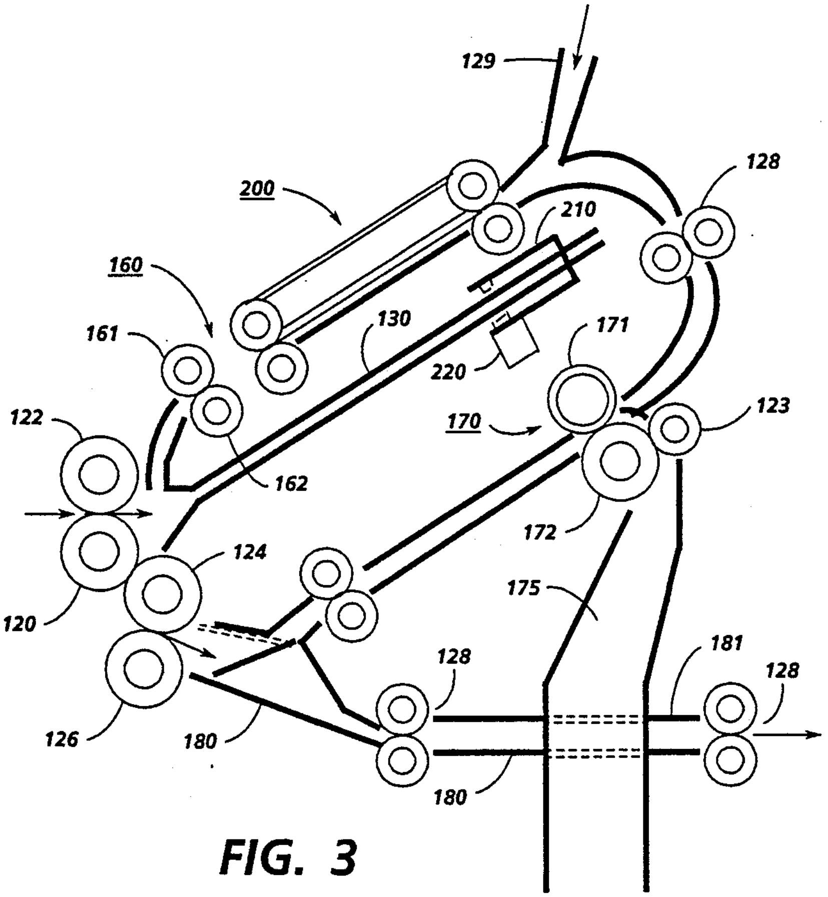
FIG. 3 is a side view schematic of an alternative embodiment of the present invention that includes a slitter.

The invention hereinbefore described shows how the recirculating folder 100 is incorporated into a direct mail system. It should be noted that with the system in FIG. 2 it is assumed that different sheets will be outputted from the printer since no slitters are shown in the recirculating loop. An alternative embodiments of the present invention is shown in FIG. 3 that is dedicated to folding $8\frac{1}{2}'' \times 11''$ sheets in a direct mail system (i.e., it doesn't have to handle $11'' \times 17''$ sheets as is the case for the apparatus of FIG. 2) and can therefore use a shorter first fold plate and recirculating loop than the folder in FIG. 2. operation of this embodiment is similar to the operation of the embodiment of FIG. 2 with the exception that this embodiment will fold only $8\frac{1}{2}'' \times 11''$ sheets and includes a slitter as well as a waste chute used for discarding waste potions of printed documents. A turned sheet is fed through rolls 120 and 122 and enters first fold chamber 130 and past sensor 220 that actuates drive roll 126. The sheet then hits first fold gate 210 and a first fold is placed in the sheet as it is driven between rolls 120 and 124. A second fold is placed in the sheet as it is driven through rolls 126 and 124 and the sheet then is directed past deflector 165 that is in the solid line positions as shown and captured by transport nips 128. A conventional slitter 170 is positioned downstream on the first transport nip 128 and is adapted to trim the edges of the sheet down to $8\frac{1}{2}'' \times 10''$ with the discarded waste traveling down chute 175 and the twice folded sheet continues to be transported by nips 128 past insertion station 129 where other materials can be inserted into the recirculating loop, if desired, and onward to pre-nesting station 160. In the meantime a printed sheet with the address information is being fed into the folder apparatus. However, before it enters the nip form between rolls 120 and 122, an adhesive is applied by a conventional gluing apparatus the same as described in FIG. 1 to the sides of the sheet and this sheet is forwarded toward first fold gate 210 and as a first fold is placed in the sheet by rolls 120 and 124 clutch actuated pre-nesting rolls 161 and 162 are actuated and the twice folded printed sheet is placed within the first fold of the address carrying sheet and the address carrying sheet is then twice folded by rolls 124 and 126 and forwarded toward the first transport nip 128 past defector 165 which is now in its up position and once the now folded and glued envelope is captured by first nip 128 it is then transported to an output location.

This exact same system of recirculating hardware previously described could also be used to make any size booklets out of $8\frac{1}{2}'' \times 11''$ or A3 size paper. For example, a sheet is fed to the folder and folded once and recirculated to the pre-nesting station. A second sheet of A3 paper has a strip of glue deposited by the glue device at its mid-span on its way to the folder. The first sheet is nested into the second at the first fold with its fold falling on the strip of glue. This process could be repeated as many times as needed.

It should now be apparent that by adding a "recirculation" function to a folding/nesting system three significant advantages are gained. First, the recirculating system eliminates the need to have feeders for the inserted documents. Second, the recirculating system totally automates the direct mail process (or for that matter any folding and inserting/nesting process). With conventional systems, such as described hereinbefore, an operator must buy or make the inserted documents in a separate operation, and then continually load the inserter feeders with these documents. The recirculating system with the present invention allows totally "hands free" operation. Thirdly, the recirculating system of the present invention allows multiple insertions (i.e., an insertion in another insertion, etc.) and an "on-line" operation with one common set of hardware.

What is claimed is:

1. An on-line recirculating folder apparatus for a direct mail application comprising: means for feeding a printed sheet to a folding location; means for forming a first fold in the sheet at said folding location; means for forming a second fold in the sheet at a second folding location; recirculating loop means for recirculating the twice folded sheet toward said folding location; wait station means for arresting the movement of said twice folded sheet before the sheet reaches said folding location; means for applying glue to the edges of an address carrying sheet, said address carrying sheet being fed from glue applying means into said first folding location where a single fold is placed therein; control means for actuating said wait station means for releasing the printed sheet held thereby in synchronization with the address carrying sheet reaching said first folding location such that the printed sheet is inserted inside the address carrying sheet before the address carrying sheet is double folded to form an envelope and stacker means for receiving the folded and glued envelope.

2. The on-line recirculating folder apparatus of claim 1, including perforator means for perforating at least one edge of the envelope in order to enhance opening of the envelope.

3. The on-line recirculating folder apparatus of claim 2, including means for inserting other sheet material into the twice folded sheet before the twice folded sheet reaches said wait station means.

4. The on-line recirculating folder apparatus of claim 3, including deflector means within the paper path of said recirculating loop means for either deflecting or not deflecting twice folded sheets.

5. The on-line recirculating folder apparatus of claim 4, including slitter means within the paper path of said recirculating loop means for trimming the twice folded sheets to a predetermined size.

6. The on-line recirculating folder apparatus of claim 1, including sitter means within the paper path of said recirculating loop means for trimming said twice folded sheets to a predetermined size.

7. An on-line recirculating folder apparatus for a direct mail application comprising: means for feeding a printed sheet to a folding location; means for forming a first fold in the sheet at said folding location; means for forming a second fold in the sheet at a second folding location; recirculating loop means for recirculating the twice folded sheet toward said folding location; slitter means for trimming the twice folded sheet to a predetermined size; wait station means for arresting the movement of said twice folded sheet before the sheet reaches said folding location; means for applying glue to the edges of an address carrying sheet, said address carrying sheet being fed from glue applying means into said first folding location where a single fold is placed therein; control means for actuating said wait station means for releasing the printed sheet held thereby in synchronization with the address carrying sheet reaching said first folding location such that the printed sheet is inserted inside the address carrying sheet before the address carrying sheet is double folded to form an envelope; and stacker means for receiving the folded and glued envelope.

8. An on-line recirculating folder apparatus for a direct mail application comprising: means for forming first and second folds in a sheet at a first and second fold location, respectively; and recirculating path means for recirculating the sheet away form said second fold location to said first fold location.

9. The on-line recirculating folder apparatus of claim 8, including slitter means within the paper path of said recirculating path means for trimming said twice folded sheets to a predetermined size.

10. The on-line recirculating folder apparatus of claim 8, including wait station means for arresting the movement of said twice folded sheets before the sheet reaches said first folding location; means for applying glue to the edges of an address carrying sheet, said address carrying sheet being fed from glue applying means into said first folding location where a single fold is placed therein; means for actuating said wait station means and releasing the printed sheet held thereby in synchronization with the address carrying sheet reaching said first folding location such that the printed sheet is inserted inside the address carrying sheet before the address carrying sheet is double folded to form an envelope; and stacker means for receiving the folded and glued envelope.

11. The on-line recirculating folder apparatus of claim 10, including perforator means for perforating at least one edge of the envelope in order to enhance opening of the envelope.

12. The on-line recirculating folder apparatus of claim 10, including means for inserting other sheet material into the twice folded sheet before the twice folded sheet reaches said wait station means.

13. The on-line recirculating folder apparatus of claim 10, including deflector means within the paper path of said recirculating loop means for either deflecting or not deflecting twice folded sheets.

14. An on-line recirculating folder apparatus for making booklets, comprising: recirculation paper path means for recirculating folded sheets; a pre-nesting station within said recirculation paper path means; means for folding a first sheet once and circulating it to said prenesting station; means for placing a strip of glue on a second sheet at a mid-span thereof on its way to said folder; means for moving said first sheet away from said pre-nesting station and into a nesting position within said second sheet such that its fold falls on said strip of glue; and means for feeding said completed booklet out of said on-line recirculating folder apparatus.

15. The on-line recirculating folder apparatus for making booklets of claim 14, including means for inserting a desired number of sheets into said booklet.

* * * * *